(12) United States Patent
Tian et al.

(10) Patent No.: US 8,315,835 B2
(45) Date of Patent: Nov. 20, 2012

(54) METHOD AND APPARATUS FOR SETTING A DETECTION THRESHOLD GIVEN A DESIRED FALSE PROBABILITY

(75) Inventors: Jun Tian, Plainsboro, NJ (US); Jeffrey Adam Bloom, West Windsor, NJ (US); Peter Georg Baum, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 340 days.

(21) Appl. No.: 12/451,987

(22) PCT Filed: Jun. 14, 2007

(86) PCT No.: PCT/US2007/014037
§ 371 (c)(1),
(2), (4) Date: Dec. 10, 2009

(87) PCT Pub. No.: WO2008/153526
PCT Pub. Date: Dec. 18, 2008

(65) Prior Publication Data
US 2010/0121608 A1    May 13, 2010

(51) Int. Cl.
*G06F 17/18* (2006.01)
(52) U.S. Cl. ........................................ 702/181
(58) Field of Classification Search ............ 702/181
See application file for complete search history.

(56) References Cited

U.S. PATENT DOCUMENTS

| | | | |
|---|---|---|---|
| 6,252,972 B1 * | 6/2001 | Linnartz | 382/100 |
| 6,385,329 B1 | 5/2002 | Sharma et al. | |
| 6,477,431 B1 * | 11/2002 | Kalker et al. | 700/39 |
| 6,768,807 B1 * | 7/2004 | Muratani | 382/100 |
| 7,539,870 B2 * | 5/2009 | Kesal et al. | 713/176 |
| 2004/0153941 A1 * | 8/2004 | Muratani | 714/746 |
| 2004/0264735 A1 | 12/2004 | Rhoads | |
| 2005/0094848 A1 | 5/2005 | Carr et al. | |
| 2006/0104477 A1 | 5/2006 | Isogai et al. | |
| 2006/0239502 A1 * | 10/2006 | Petrovic et al. | 382/100 |
| 2007/0165852 A1 * | 7/2007 | Roberts | 380/201 |
| 2009/0019286 A1 * | 1/2009 | Roberts | 713/176 |

OTHER PUBLICATIONS

Kang et al.: "Multi-band Wavelet Based Digital Watermarking Using Principal Component Analysis", Digital Watermarking Lecture Notes in Computer Science, Springer-Verlag, vol. 3710, 2005, pp. 139-146.

Lee et al.: "Improved Autocorrelation Function Based Watermarking with Side Information", Journal of Electronic Imaging, SPIE / IS & T, US, vol. 14, No. 1, Jan. 1, 2005, pp. 13012-1.

(Continued)

*Primary Examiner* — Cindy H Khuu
(74) *Attorney, Agent, or Firm* — Robert D. Shedd; Jeffrey M. Navon; Catherine A. Cooper

(57) ABSTRACT

A method and apparatus are described for determining a threshold, including selecting a desired false result probability, and selecting a threshold value from a threshold table corresponding to the desired false result probability. Also described are a method and apparatus for determining a threshold corresponding to a desired false result probability, including calculating a false result probability, calculating a difference value between the calculated false result probability and the desired false result probability, comparing the difference value to a first predetermined value and comparing the difference value to a second predetermined value if a result of the first comparing act is positive.

12 Claims, 8 Drawing Sheets

OTHER PUBLICATIONS

Miller et al.: "Computing the Probability of False Watermark Detection", Information Hiding Lecture Notes in Computer Science, Springer-Verlag, vol. 1768, 2000, pp. 146-158.

Ni et al..: "Adaptive Watermarking Model and Detection Performance Analysis", First Int. Conference on Innovative Computing, vol. 3, Aug. 30, 2006, pp. 479-482.

International Search Report, dated Feb. 15, 2008.

Cox, I. J., et al., "Digital Watermarking," Chapter 6—Analyzing Errors, pp. 157-199, 200. Morgan Kaufmann, San Francisco (USA), 2008.

* cited by examiner

US 8,315,835 B2

METHOD AND APPARATUS FOR SETTING A DETECTION THRESHOLD GIVEN A DESIRED FALSE PROBABILITY

This application claims the benefit, under 35 U.S.C. §365 of International Application PCT/US2007/014037 filed Jun. 14, 2007, which was published in accordance with PCT Article 21(2) on Dec. 18, 2008 in English.

FIELD OF THE INVENTION

The present invention relates to setting a detection threshold and in particular to setting a detection threshold given a desired false positive probability.

BACKGROUND OF THE INVENTION

It is critically important in many watermarking applications that the false positive probability of a watermark detector is below a given value. A false positive occurs when the watermark detector incorrectly identifies an unwatermarked work as watermarked. One example of a system where this is important is the use of a watermark in video content to indicate to a recorder or recording device that the video material should not be copied. If a false positive occurs during a recording, the recording device monitoring for that watermark will incorrectly conclude that the video content should not be copied and recording will be halted. If this occurs during the recording of a wedding ceremony, the camera manufacturer will have a very unhappy bride and groom. If this happens during a television broadcast of a popular program, the recorder manufacturers will have many unhappy customers. Thus, recorder manufacturers have typically required that such a copy control watermark have a false positive probability that is close to the probability of a hardware component failure; in the range of between 1 error in $10^9$ detections to 1 error in $10^{12}$ detections.

To further understand the problem of false positive probability, consider the illustration shown in FIG. 2a, which shows two distributions. The distribution on the left represents the detection values that could be expected when the watermark detector is applied to content that does not contain a watermark. The mean of this distribution is zero and most often, it could be expected to be close to zero. This is a probability curve, so the area under the curve is equal to 1.0. The distribution on the right represents the detection values that could be expected when the detector is applied to watermarked content. Here, the mean is M and the detection value is usually close to M. The role of a threshold is to distinguish between samples from these two distributions. Consider the threshold at the point marked T. When the detection value exceeds T, it can be concluded that the content comes from the right-hand distribution. When the detection value is below T, it can be concluded that the content comes from the left-hand distribution. As can be seen from FIG. 2a, there are some samples from the right-hand distribution that are below the threshold T. These are marked works for which detection will fail, sometimes called false negatives. Similarly, there are some samples from the left-hand distribution that exceed the threshold. These are unmarked works that the detector will label as marked. These are false positives.

The probability of false negatives can be improved by lowering the threshold. This action will, however, simultaneously increase the probability of a false positive indication. In the example shown, the two distributions overlap. That means that a threshold that eliminates errors cannot be selected. In many watermarking applications, the detection threshold T is selected based on an application specific false positive probability requirement. It should be noted that the false positive probability is independent of the watermark embedding algorithm. It is simply the area under the left-hand curve that is greater than the threshold T.

FIG. 2b shows a closer view of the left-hand curve in the vicinity of the threshold. The area under the curve that is greater than the threshold T is shown shaded. This area represents the false positive probability, the probability that a watermark will be detected in an unmarked work.

Given a false positive probability requirement, it would be advantageous to have a method and system for establishing the lowest threshold that satisfies the false positive probability requirement.

As used herein, "/" denotes alternative names for the same or similar components or structures. That is, a "/" can be taken as meaning "or" as used herein.

SUMMARY OF THE INVENTION

The present invention resulted from trying to solve a problem in the field of watermarking, and in particular, in the field of digital watermarking of audio and video content.

This false positive probability is well understood for detectors that use a normalized correlation detection measure. However, in an effort to increase watermark robustness, a number of researchers have proposed detection measures that combine multiple normalized correlations. One such measure is the ratio of the largest normalized correlation to the second largest when an extracted vector is compared to multiple reference vectors. The present principles rely on an analysis of the false positive probability of the correlation ratio detection measure under a reasonable assumption about the distribution of unwatermarked works.

Researchers have investigated this problem when the detection measure is normalized correlation. M. L. Miller and J. A. Bloom, "Computing the Probability of False Watermark Detection", Proceedings of the Third International Workshop on Information Hiding, pp. 146-158, 1999. It is believed that nobody has worked on the problem when the detection measure is the ratio of two normalized correlations.

Therefore, the present invention is directed to a method and a corresponding system for automatically setting the detection threshold in a watermark detection system when the detection measure is the ratio of the largest normalized correlation to the second largest normalized correlation and the desired false positive probability is given. While the present invention is described in terms of determining a threshold corresponding to a false positive probability, it is not so limited. The threshold determining method and apparatus of the present invention could be used for determining a threshold corresponding to any false result probability, for example, a false negative probability. While the threshold determination method of the present invention is explained in terms of watermark detection, there are many other areas where threshold determination are critical, such as in the field of medical imaging, image or audio registration, image or audio recognition, pattern recognition, and object detection, identification, and classification. In the area of pattern recognition, including signature analysis of radar and sonar, threshold determination in the "identify friend or foe" scenario is one example of extremely critical use of the present invention. In the "identify friend or foe" scenario, any mistake in incorrectly identifying friend or foe could be deadly.

A method and apparatus are described for determining a threshold, including selecting a desired false result probability and selecting a threshold value from a threshold table corresponding to the desired false result probability. Also described are a method and apparatus for determining a threshold corresponding to a desired false result probability, including calculating a false result probability, calculating a difference value between the calculated false result probability and the desired false result probability, comparing the difference value to a first predetermined value and comparing the difference value to a second predetermined value if a result of the first comparing act is positive.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1A:
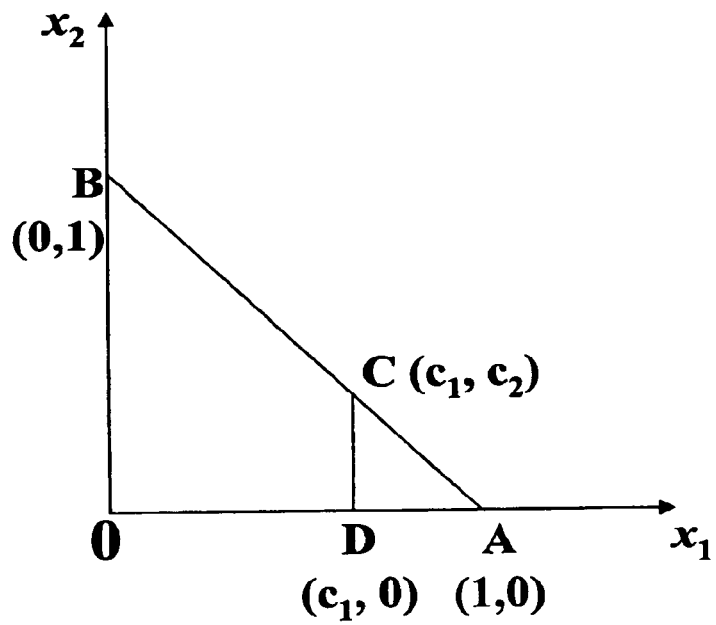
FIG. 1a depicts the geometric interpretation of the analytic formula where m=2.

Before the method and apparatus can be described, it is necessary to lay a mathematical foundation. A critical issue for many watermarking applications is the probability that the watermark detector incorrectly identifies an unmarked work as watermarked. This false positive probability is well understood for detectors that use a normalized correlation detection measure. However, in an effort to increase watermark robustness, a number of researchers have proposed detection measures that combine multiple normalized correlations. One such measure is the ratio of the largest normalized correlation to the second largest when an extracted vector is compared to multiple reference vectors. An analytic formula for the false positive probability is derived and validated with empirical data. Correlation has a theorem that relates spatial domain processing and frequency domain processing via the Discrete Fourier Transform (DFT). Thus, correlations can be performed in the time or frequency domains. Correlation is used to determine the degree of similarity between data sets.

Digital watermarking is the process of embedding an invisible message into a digital work (such as an audio tile, still image, or image sequence) for the purpose of communicating information about that work. Applications include copyright communication, content authentication, counterfeit deterrence or detection; forensic tracking, and broadcast monitoring.

Errors are inevitable in even the best-designed watermarking system. A false positive error occurs when a watermark detector indicates the presence of a watermark in an unwatermarked work. Such an error can lead to the mistaken prevention of a legitimate operation or to accusation of an innocent customer. Thus, the false probability has become a critical issue for many watermarking applications. This probability depends on the watermark detection algorithm, the manner in which the detector is used, and the distribution of unwatermarked works.

The problem of analyzing false detection behavior has received little attention in the watermark literature. One prior art scheme provides a model to predict false positive probability in correlation-based watermarking methods and shows that a *non-white spectrum of a watermark causes the image content to interfere with watermark detection. Another prior art scheme includes false detection probability in their framework for discussing watermarking systems. Yet another prior art scheme presents a precise method of calculating the false positive probability when using a normalized correlation detector. An exact formula for the false positive probability is provided under the assumption that the vectors extracted from unwatermarked works are drawn from a radially symmetric distribution. Yet another prior art scheme studies the false positive probability in exhaustive geometric searches. There it is shown that image and key dependency in the watermark detector lead to different false positive probability for geometric searches.

For many applications, an extracted vector is compared to a number of different watermark reference vectors. Each reference vector is associated with a different message symbol. The message symbol associated with the reference vector that has the highest similarity to the extracted vector is reported as the detected symbol. The certainty of the detection is the degree of similarity. The most common similarity measure used is normalized correlation. By using the formula of one of the prior art schemes, the false positive probability requirement of the application can be used to set a threshold. When the detection value exceeds the threshold, the symbol is reported as present, otherwise the detector reports no symbol.

In an effort to improve the robustness of such techniques, some researchers have proposed certainty measures that combine the largest correlation value with the second largest correlation value. One such approach considers the difference of these two values as the certainty and another considers the ratio of the two values as the certainty. In both cases, false positive analyses are missing and without these, there is no way to set a threshold and perform a fair robustness comparison. An analytic formula is derived herein for the probability of false positive for the correlation ratio measure and empirical data to support this analysis is presented.

The probability of false watermark detection is determined by the design of the watermark detector and the distribution of unwatermarked content processed by it. The embedding algorithm is not relevant to computing this probability, because it is assumed that no watermark has been embedded.

Consider a specific, but typical, normalized correlation watermark detector. The input work is first processed to extract an n-dimensional feature vector, V. Examples of watermark extraction include various combinations of frequency transforms, block averaging, spectral shaping, whitening and sub-sampling. These processes are intended to increase robustness, to increase signal-to-noise ratio, to increase efficiency of detection, and/or to enforce the distribution assumed by the detection measure.

The extracted feature vector V is then compared to a set of n-dimensional reference vectors $\{W_1, W_2, \ldots, W_m\}$ $m \leq n$, to obtain a correlation ratio detection measure $D_v$. Each reference vector typically represents one of m message symbols and the symbol associated with the reference vector most similar to the extracted vector is the reported symbol. Only when the detection measure exceeds a detection threshold T, does the detector report a positive detection. Otherwise no watermark is reported as having been detected.

The exact formula for computing the detection measure is critical to determining the false positive probability. Normalized correlation is one of the most common techniques that is employed in the detection measure. The normalized correlation between two n-dimensional vectors V and $W_i$ is $$C_{V,W_i} = \frac{V \cdot W_i}{\sqrt{(V \cdot V)(W_i \cdot W_i)}}$$

where the symbol • is the inner product. Two other published detection measures based on normalized correlation are the difference between the largest and second largest magnitude correlation and the ratio between the largest and second largest magnitude correlation.

Consider the correlation ratio detection measure. The set of $|C_{V,W_i}|$ is calculated for all m reference vectors, $W_i$. These are then sorted from largest to smallest.

$$|C_{V,W_{i1}}| \geq C_{V,W_{i2}} \geq \ldots \geq |C_{V,W_{im}}|$$

The correlation ratio detection measure is then defined as $$D_V = \frac{|C_{V,W_{i1}}|}{|C_{V,W_{i2}}|}, \quad (1)$$

and the message symbol associated with $W_{i1}$, is reported, when $D_v$ exceeds the detection threshold. Note that $D_v$ is always, greater than or equal to 1.

Next the correlation ratio detection measure (1) is studied and an analytic formula is derived for the false positive probability, i.e., $P(D_v>T)$, the probability that $D_v>T$ for an unwatermarked work, where T is the detection threshold.

Consider the set of reference vectors $\{W_1, W_2, \ldots, W_m\}$ where $|W_i|=\sqrt{W_i \cdot W_i}=1$ and $W_i \cdot W_j=0$ for $i \neq j$. In other words, the set $\{W_1, W_2 \ldots W_m\}$ is an orthonormal basis for an m-dimensional vector space. When m<n this set can be expanded to an orthonormal basis for the n-dimensional vector space, where V and $\{W_i\}$ reside, by adding n−m unit length vectors to the set where each is orthogonal to all others and to those of $\{W_i\}$. An orthonormal basis in n dimensions is denoted as $\{W_1, W_2, \ldots W_m, e_{m+1}, e_{m+2}, \ldots, e_n\}$.

In linear algebra, two vectors in an inner product space are orthonormal if they are orthogonal and both of unit length. Orthogonal vectors are perpendicular to each other. That is, their inner product is 0.

Projection of two vectors from one orthonormal basis to another represents a rotation of the axes and this does not change the angle between the vectors. Thus, the normalized correlation between two vectors and the detection measure $D_V$ are invariant to orthogonal transformations. Consider the projection of V onto this new basis $\{W_1, W_2, W_m, e_{m+1}, e_{m+2}, \ldots, e_n\}$ and let the coefficients in this space be denoted $\{v_1, v_2, \ldots, v_n\}$. Then the normalized correlation can be written $$C_{V,W_i} = \frac{V \cdot W_i}{\sqrt{(V \cdot V)(W_i \cdot W_i)}} = \frac{v_i}{\sqrt{V \cdot V}}.$$

Since $$\frac{1}{\sqrt{V \cdot V}},$$

is a common factor in all $C_{V,W_i}$ for $i=1, 2, \ldots, m$, it can be dropped off and $|v_i|$ can be sorted directly, $$|v_{i1}| \geq |v_{i2}| \geq \ldots \geq |v_{im}|.$$

The correlation ratio detection measure becomes $$D_V = \frac{|v_{i1}|}{|v_{i2}|} \quad (2)$$

and a false positive event $D_v>T$, is equivalent to $$|v_{i1}| > T \cdot |v_j|, \text{ for all } j \neq i1. \quad (3)$$

If it is assumed that each $|v_i|$ has the same likelihood of being the largest (a reasonable assumption given that the case in which no watermark was embedded is under investigation), then the probability of any normalized correlation being large enough to cause a false positive is m times greater than the probability of $V_1$ causing a false positive. This is denoted as follows:

$$P_{fp} = P(D_V>T) = m \cdot P(D_V>T/1=1). \quad (4)$$

From equation (2), it is clear that a false positive event is scalar invariant. That is, if for some feature vector V, its detection measure $D_V$ is greater than the threshold T, then for a scaled version $\alpha \cdot V = \{\alpha \cdot v_1, \alpha \cdot v_2, \ldots, \alpha \cdot v_n\}$, where $\alpha$ is a to non-zero constant, $D_{\alpha \cdot v}$ is also greater than T. Thus, V can be normalized such that is $l^1$ norm is equal to 1, $$\sum_{i=1}^{n} |v_i| = 1.$$

This describes a point on the unit hyper-plane $$H_n = \left\{ (x_1, x_2, \ldots, x_n) \,\middle|\, \sum_{i=1}^{n} |x_i| = 1 \right\}$$

(which is actually a union of $2^n$ hyper-planes of dimension n−1). The distribution of V on the unit hyper-plane $H_n$ is important to analyzing the detection behavior and, more specifically, the false positive probability.

This analysis applies to the use of detection features that yield a normalized feature vector V that, for unwatermarked works, can be approximated by a random variable drawn from a uniform distribution on the unit hyper-plane $H_n$. As a first assumption, the normalized feature vector V from an unwatermarked work is uniformly distributed on the unit hyper plane $H_n$. Assumption 1, combined with the fact that a false positive event is scalar invariant, suggests that the false positive probability $P(D_V>T)$ is equal to the portion of normalized feature vectors on the unit hyper-plane $H_n$ such that, their detection measures are greater than the threshold T, $$P(D_V > T) = \frac{\text{Area}(V \in H_n, D_V > T)}{\text{Area}(H_n)}. \quad (5)$$

A positive hyper-plane $$H_n^+ = \left\{(x_1, x_2, \ldots, x_n) \mid x_i \geq 0, \text{ and } \sum_{i=1}^n x_i = 1\right\}$$

where $H_n^+$ is one of the $2^n$ hyper-planes in $H_n$ for which all the coordinates are non-negative, is defined. Then, by symmetry, equation (5) is equivalent to $$P(D_V > T) = \frac{\text{Area}(V \in H_n^+, D_V > T)}{\text{Area}(H_n^+)}. \quad (6)$$

The false positive probability in equation (6) is independent of n, the dimension of the vector space where V and $W_i$, reside. A proof of this follows. Putting a subscript in P, V, and H to denote the dimension, then $$\text{Area}(V_{n+1} \in H_{n+1}^+, D_{V_{n+1}} > T) =$$
$$\text{Area}\left(\sum_{i=1}^n v_i = 1 - v_{n+1}, v_{n+1} \geq 0, D_{V_n} > T\right),$$

where $V_n = \{v_1, v_2, \ldots, v_n\}$, and $$\text{Area}(H_{n+1}^+) = \text{Area}\left(\sum_{i=1}^n v_i = 1 - v_{n+1}, v_{n+1} \geq 0\right).$$

Note that $$\text{Area}\left(\sum_{i=1}^n v_i = 1 - v_{n+1}, v_{n+1} \geq 0, D_V > T\right) =$$
$$\int_0^1 (1 - v_{n+1})^{n-1} \cdot \text{Area}(V_n \in H_n^+, D_{V_n} > T) d v_{n+1},$$

and $$\text{Area}\sum_{i=1}^n (v_i = 1 - v_{n+1}, v_{n+1} \geq 0) = \int_0^1 (1 - v_{n+1})^{n-1} \cdot \text{Area}(H_n^+) d v_{n+1}.$$

Combining all the above, it follows that $$P_{n+1}(D_{V_{n+1}} > T) = \frac{\text{Area}(V_{n+1} \in H_{n+1}^+, D_{V_{n+1}} > T)}{\text{Area}(H_{n+1}^+)}$$

$$= \frac{\text{Area}\left(\sum_{i=1}^n v_i = 1 - v_{n+1}, v_{n+1} \geq 0, D_{V_{n+1}} > T\right)}{\text{Area}\left(\sum_{i=1}^n v_i = 1 - v_{n+1}, v_{n+1} \geq 0\right)}$$

$$= \frac{\int_0^1 (1 - v_{n+1})^{n-1} \cdot \text{Area}(V_n \in H_n^+, D_{V_n} > T) d v_{n+1}}{\int_0^1 (1 - v_{n+1})^{n-1} \cdot \text{Area}(H_n^+) d v_{n+1}}$$

$$= \frac{\text{Area}(V_n \in H_n^+, D_{V_n} > T)}{\text{Area}(H_n^+)}$$

$$= P_n(D_{V_n} > T).$$

Thus the false positive probability $P(D_V > T)$ is independent of the dimension n of the feature vector. In particular, $P(D_V > T)$ can be computed by setting n=m.

An analytic formula for $P(D_V = T)$ can be derived through a geometric interpretation of Equation 6, now given. Beginning with m=2, $H_2^+ = \{(x_1, x_2) \mid x_i \geq 0, \text{ and } x_1 + x_2 = 1\}$. In FIG. 1a, O=(0, 0), A=(1, 0), and B=(0,1). All unmarked content will yield a detection on the line segment AB. The line segment AB is $H_2^+$. The point C=$(c_1, c_2)$, where $c_1 = T \cdot c_2$, represents the boundary between a positive and a negative detection. Since all positive detections are false detections, the probability of false positive is the ratio of the length of line segment AC to the whole, the length of line segment AB: Add a point D=$(c_1, 0)$ on the line segment AO. This is the projection of C onto $x_1$. Then, since $|AO| = |AD| + |DO| = c_2 + c_1 = c_2 + Tc_2 = (T+1)c_2$, $$P(D_V > T \mid i1 = 1) = \frac{|AC|}{|AB|} = \frac{|AD|}{|AO|} = \frac{1}{T+1}.$$

So $$P(D_V > T) = 2 \cdot P(D_V > T \mid i1 = 1) = \frac{2}{T+1}.$$

Figure 1B:
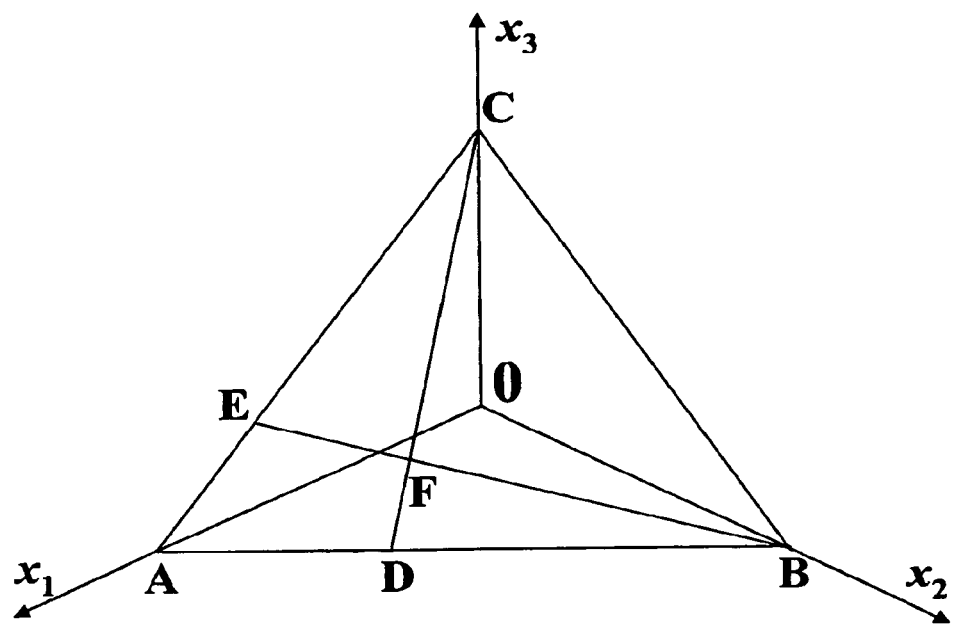
FIG. 1b depicts the geometric interpretation of the analytic formula where m=3.

When m=3, $H_3^+ = \{(x_1, x_2, x_3) \mid x_i \geq 0, \text{ and } x_1 + x_2 + x_3 = 1\}$. In FIG. 1b, O=(0, 0, 0), A=(1, 0, 0), B=(0, 1, 0), and C=(0, 0, 1). The planar patch ABC is $H_3^+$. The point D=$(d_1, d_2, 0)$ is a point on the line segment AB such that $d_1 = T \cdot d_2$, and the point E=$(e_1, 0, e_3)$ is point on the line segment AC such that $e_1 = T \cdot e_3$. The point F is the intersection of CD and BE. Then $$P(D_V > T \mid i1 = 1) = \frac{\text{Area}(ADFE)}{\text{Area}(ABC)}$$

$$= \frac{\text{Area}(ADC) - \text{Area}(CEF)}{\text{Area}(ABC)}$$

$$= \frac{\text{Area}(ADC)}{\text{Area}(ABC)} - \frac{\text{Area}(CEF)}{\text{Area}(BCE)} \cdot \frac{\text{Area}(BCE)}{\text{Area}(ABC)}$$

$$= \frac{|AD|}{|AB|} - \frac{|EF|}{|EB|} \cdot \frac{|CE|}{|CA|}$$

$$= \frac{1}{T+1} - \frac{1}{T+2} \cdot \frac{T}{T+1}$$

$$= \frac{2}{(T+1)(T+2)}.$$

So $$P(D_V > T) = 3 \cdot P(D_V > T \mid i1 = 1) = \frac{6}{(T+1)(T+2)}.$$

When m=4, $H_4^+ = \{(x_1, x_2, x_3, x_4) \mid x_i \geq 0, \text{ and } x_1 + x_2 + x_4 + x_4 = 1\}$. Then $$P(D_V > T \mid i1 = 1) = \frac{\text{Area}(V \in H_4^+, v_1 > T \cdot v_2, v_1 > T \cdot v_3)}{\text{Area}(H_4^+)} -$$

$$\frac{\text{Area}\begin{pmatrix} V \in H_4^+, v_1 > T \cdot v_2, \\ v_1 > T \cdot v_3, v_1 \le T \cdot v_4 \end{pmatrix}}{\text{Area}(H_4^+)}$$

$$= \frac{2}{(T+1)(T+2)} - \frac{2 \cdot T}{(T+1)(T+2)(T+3)}$$

$$= \frac{6}{(T+1)(T+2)(T+3)}.$$

So $$P(D_V > T) = \frac{3}{(T+1)(T+2)(T+3)}.$$

Continuing by deduction, one can derive an analytic formula of the false positive probability $P(D_V > T)$ for any m, which is $$P_{fp} = P(D_V > T) = \frac{m!}{\prod_{i=1}^{m-1}(T+i)}. \quad (7)$$

Figure 1C:
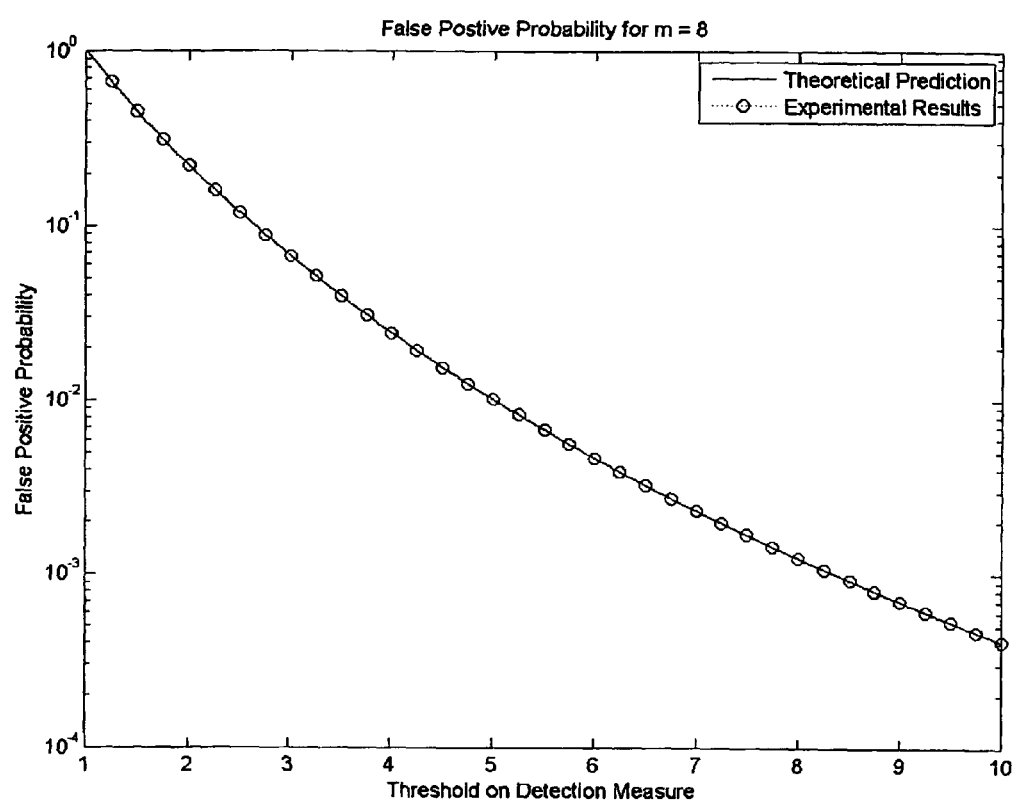
FIG. 1c shows the results of the comparison of the synthetic vectors with the predictions using the analytic formula.
Figure 2A:
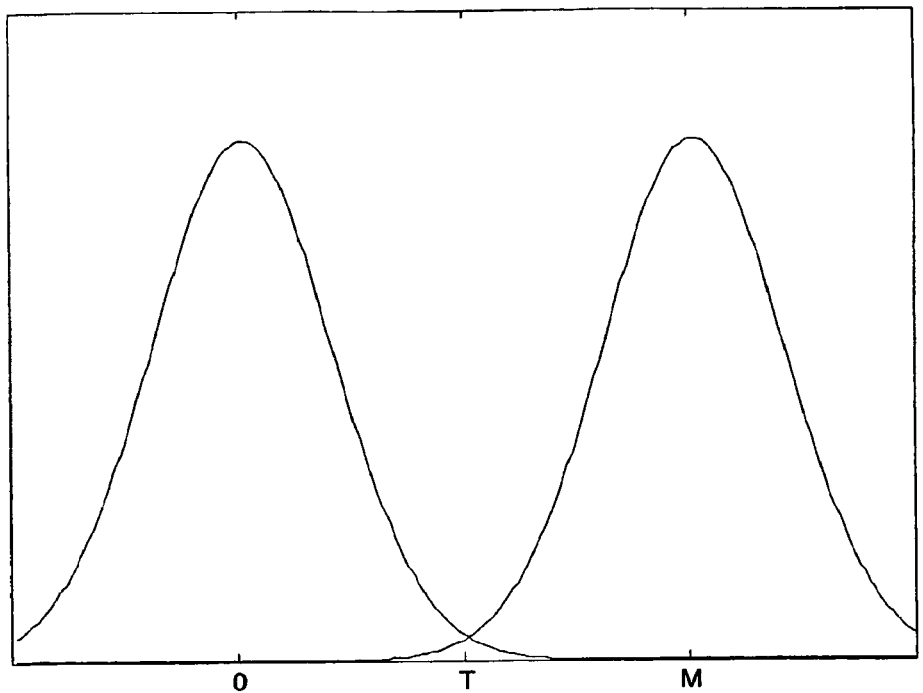
FIG. 2a shows two distributions—the probability of detection values for marked and unmarked works.
Figure 2B:
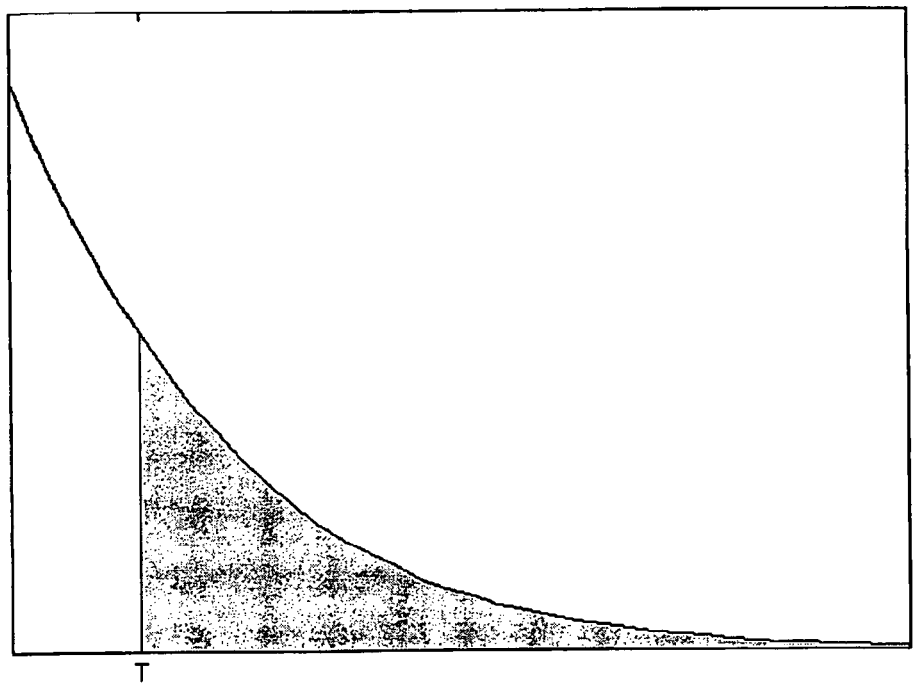
FIG. 2b is a closer view of the distribution of detection values for unmarked works depicted in FIG. 1 in the area of threshold, T.

To verify that the formula in equation (7) is correct, its predicted results were compare against results obtained from 100,000 synthetic vectors drawn from a unit hyper-plane uniform distribution. The dimension of the feature vector is 1024 (n=1024). There are 8 orthogonal watermark vectors in the detector (m=8). FIG. 1c shows the results of the comparison of the synthetic vectors against the predictions made by equation (7). The analytic formula's predictions matches the experimental results very closely down to at least $P_{fp}=10^{-4}$.

Figure 3A:
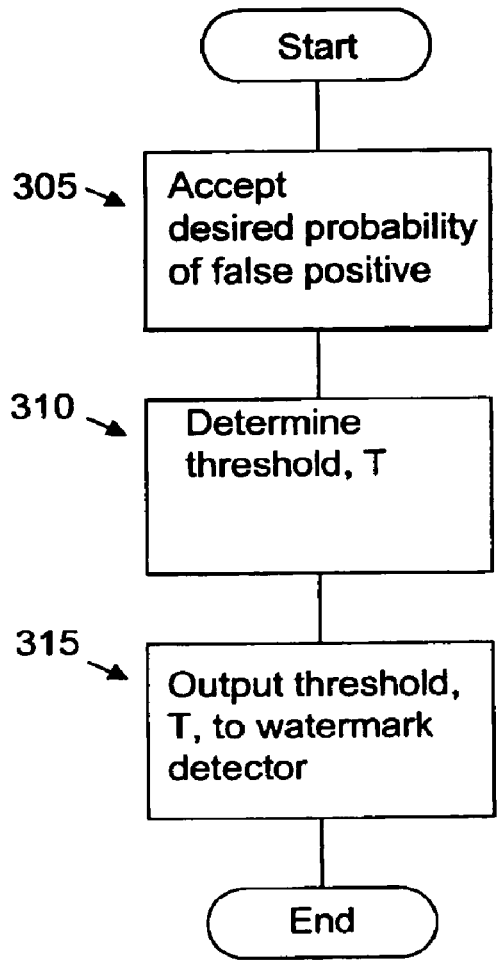
FIG. 3a is a flowchart of an embodiment of the threshold determination method of the present invention.

FIG. 3a is a flowchart of an embodiment of the threshold determination method of the present invention. A desired false positive probability is accepted at 305. This requirement is specific to the application environment in which the watermark detection takes place. A threshold is determined at 310 and output to the watermark detector at 315. In accordance with the above description, a table of threshold values may be generated either at initialization or at some other time in advance or during the first threshold determination. Equation 7 above is used to generate the table of threshold values (threshold table). A table generator uses equation 7 along with an initial or minimum threshold value, a final or maximum threshold and an interval size. The threshold table creates a correspondence between a selection of thresholds and the false positive probabilities which they imply.

For purposes of the embodiments of the present invention described herein, an initial threshold value can be input by a user or selected. If selected, one possible initial threshold value is the lower bound of a false negative probability. Further, correspondingly, for the final threshold value, if selected, one possible final threshold value is a upper bound of said false positive probability. The increments or threshold intervals used in the calculations are selected based on among other factors the storage available to store the threshold table or the desired accuracy of the calculations.

Figure 3B:
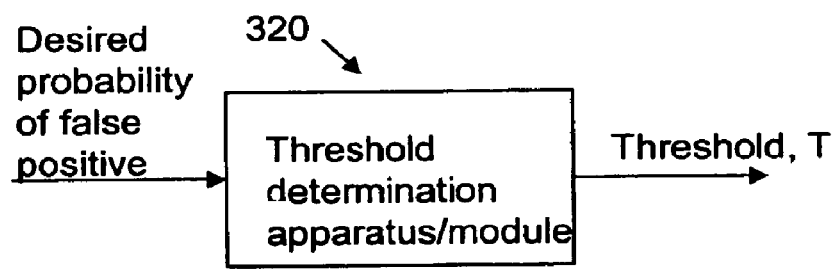
FIG. 3b is a block diagram of the threshold determination apparatus or module of the present invention.

FIG. 3b is a block diagram of the threshold determination apparatus or module of the present invention. Threshold determination apparatus or module accepts the desired false positive probability as input, determine the threshold and outputs the threshold to a watermark detector.

Figure 4A:
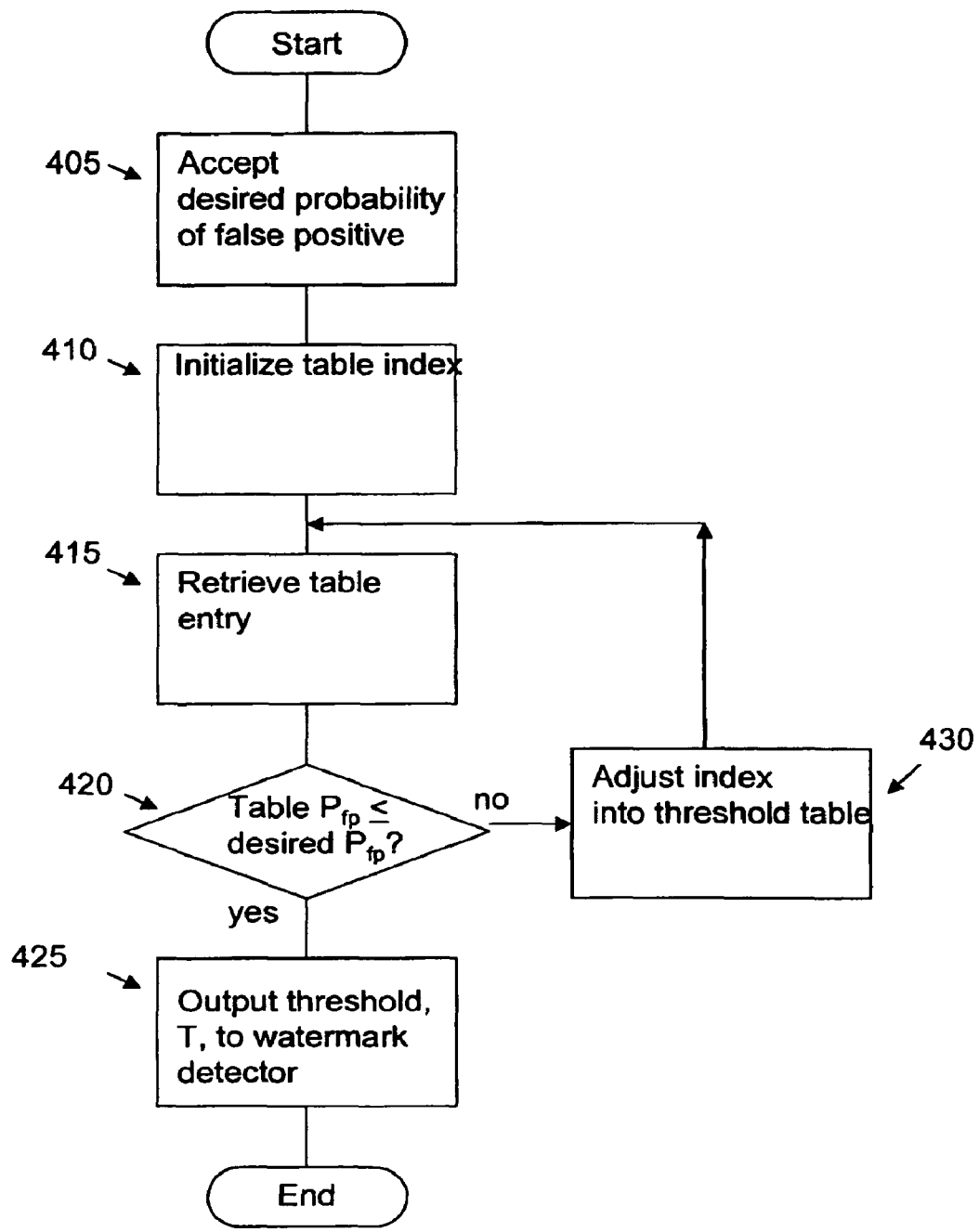
FIG. 4a is a flowchart of one embodiment of the threshold determination method of the present invention.

FIG. 4a is a flowchart of one embodiment of the threshold determination method of the present invention. A desired false positive probability is accepted at 405. The index into the threshold table prepared at initialization or otherwise in advance is initialized at 410. A table entry is retrieved from the table based on the index at 415. It should be kept in mind that the index may not be necessarily initialized to a first table entry. Various table look-up scheme are known in the prior art including a binary method where the table index is initialized to approximately the halfway point in the table. This is repeated so that the entire table need not be searched. The retrieved table entry is compared to the desired false positive probability at 420 and if less than the desired false probability and there are no other threshold entries that are both greater than the retrieved threshold and are less that the desired false positive probability then the determined threshold is output to the watermark generator at 425. If there may be threshold entries that are greater than the retrieved threshold table entry and which are also less than the desired false positive probability then the table index is adjusted at 430.

Figure 4B:
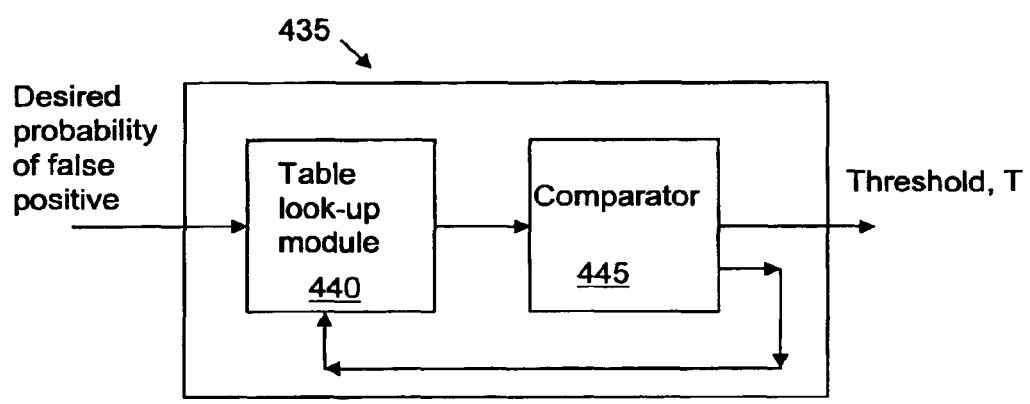
FIG. 4b is a block diagram of threshold determination apparatus or module.

FIG. 4b is a block diagram of threshold determination apparatus or module 435, which includes table look-up module 440 and comparator 445. Table look-up module retrieves threshold table entries from the previously generated threshold table using an index. Comparator 445 performs the comparison and if the criteria are met outputs the threshold to the watermark detector and if the criteria are not met then returns to the table look-up module having adjusted the table index. The table index may be adjusted by either the table look-up module or the comparator or another module (not shown) which performs that function.

Figure 5A:
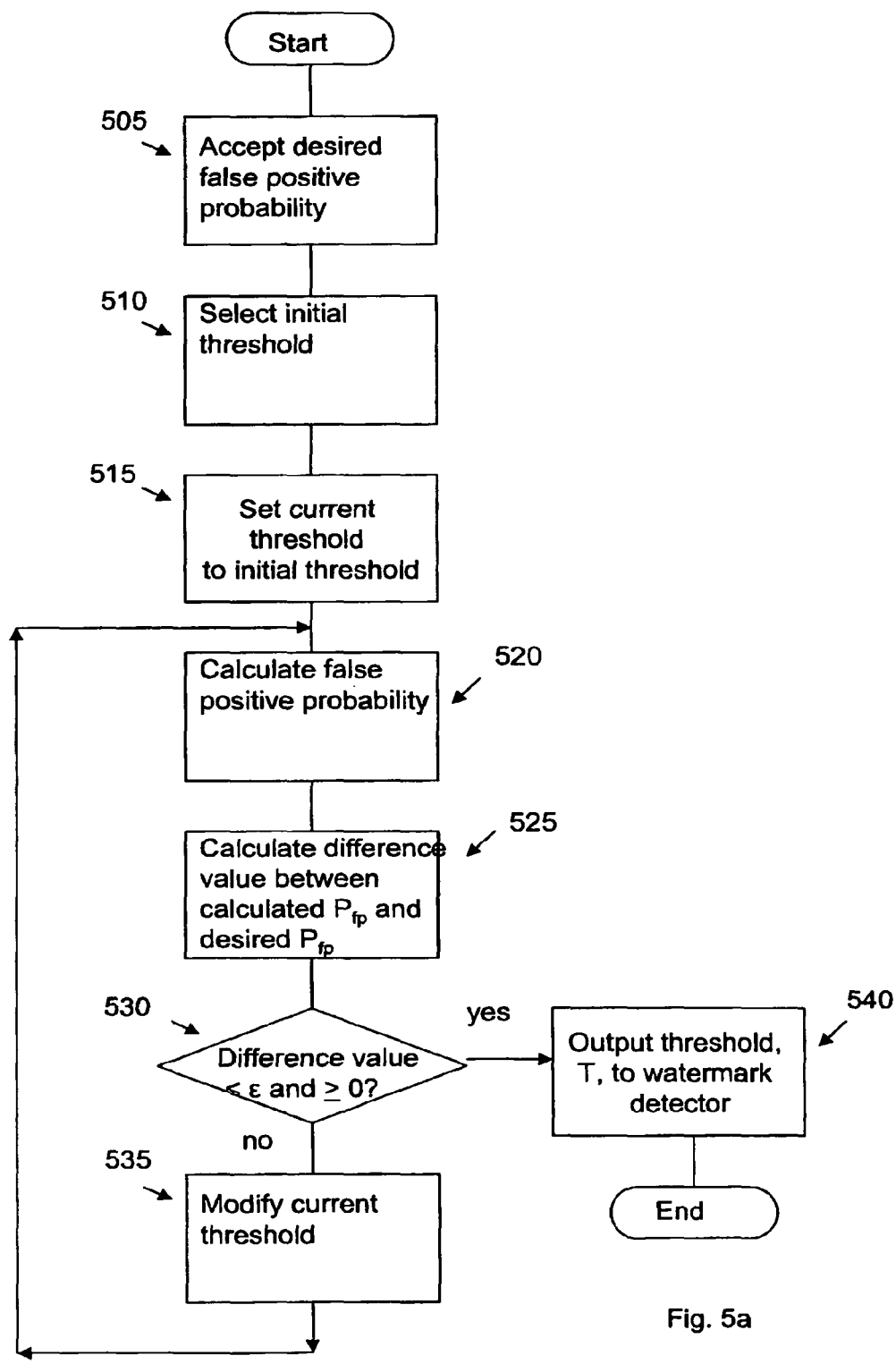
FIG. 5a is a flowchart of an alterative embodiment of the threshold determination method of the present invention.

FIG. 5a is a flowchart of an alterative embodiment of the threshold determination method of the present invention. In this embodiment a threshold table is not prepared in advance but the threshold is determined through iterative calculations. At 505, the desired false positive probability is received or accepted as input. An initial threshold value is selected at 510. It should be noted that the initial threshold value may also be input by a user. The current threshold is initialized to the initial threshold value that was either selected or input at 515. The current threshold value is used to calculate a false positive probability at 520. A difference value between the desired false positive probability and the calculated false positive probability is calculated at 525. The difference value is compared to 0 and to a pre-determined value $\epsilon$ at 530. If the difference value is greater than or equal to 0 and less than a predefined value $\epsilon$, then the system will output the current threshold value, T, to a watermark detector at 540. If the difference value is negative or greater than the value $\epsilon$, then the current threshold is modified at 535 in accordance with the sign and magnitude of the difference value. The modified current threshold is used to re-calculate a new false positive probability using the current threshold value. This process continues until the difference value is greater than or equal to zero and below the value $\epsilon$. When this occurs, the current threshold value, T, will be output to a watermark detector at 540. The current threshold value yields a false positive probability that is less than the required/desired false positive probability by at most $\epsilon$.

Figure 5B:
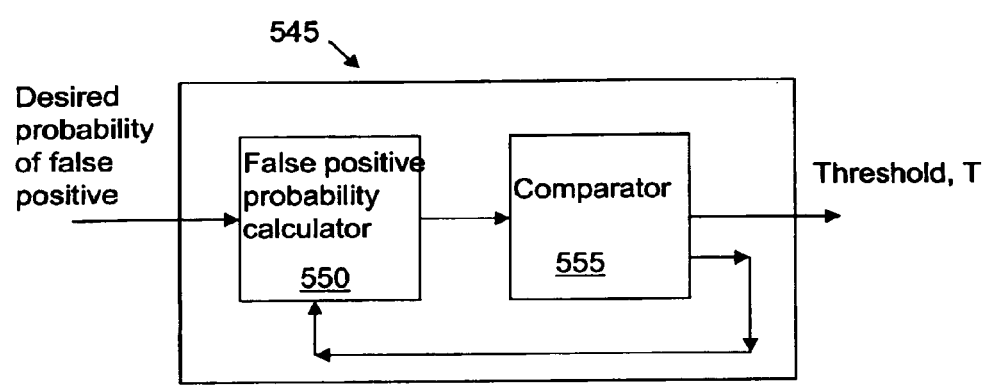
FIG. 5b is a block diagram of an alterative embodiment of the threshold determination apparatus of the present invention.

FIG. 5b is a block diagram of an alterative embodiment of the threshold determination apparatus 545 of the present invention, which includes false positive probability calculator module 550 and comparator 555. False positive probability calculator 550 calculates a false positive probability value using a (current) threshold value and also calculates a difference between a desired/required false probability value and the calculated false positive probability value. Comparator 555 performs a comparison between the difference value and 0 and also between the difference value and a pre-determined value ε. If the difference value is greater than or equal to 0 and less than a predefined value ε, then the system will output the current threshold value, T, to a watermark detector. If the difference value is negative or greater than the value ε, then the current threshold is modified in accordance with the sign and magnitude of the difference value. The modified current threshold is used to re-calculate a new false positive probability using the current threshold value. This process continues until the difference value is greater than or equal to zero and below the value ε. When this occurs, the current threshold value, T, will be output to a watermark detector. The current threshold value yields a false positive probability that is less than the required/desired false positive probability by at most ε.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for determining a watermark detection threshold value in a watermark detection system, said method comprising:
   selecting a desired false result probability; and
   determining, by a processor, the watermark detection threshold value, wherein the watermark detection threshold value is determined using the selected desired false result probability given by $$P_{fp} = \frac{m!}{\prod_{i=1}^{m-1}(T+i)}$$

where $P_{fp}$ is said desired false result probability, T is said watermark detection threshold value and m is a dimension of a feature vector, and wherein the watermark detection threshold value is set when a watermark detection measure is a ratio of a largest normalized correlation to a second largest normalized correlation.

2. The method according to claim 1, further comprising:
   creating a threshold table, wherein
   said creating act further comprises:
      calculating each false result probability entry in said threshold table using $$\frac{m!}{\prod_{i=1}^{m-1}(T+i)}$$

storing said calculated false result probability in said threshold table and said threshold value used to calculate said false result probability entry;
   selecting said threshold value from said threshold table corresponding to said desired false result probability, or by performing iteratively the steps of:
   setting a current threshold value to said first threshold value;
   calculating a false result probability using said current threshold value;
   calculating a difference value between said calculated false result
   probability and said desired false result probability;
   comparing said difference value to a first predetermined value;
   comparing said difference value to a second predetermined value if a
   result of said first comparing act is positive; and
      modifying said current threshold value responsive to said comparisons.

3. The method according to claim 2, wherein said calculating act is performed using a first threshold value, a second threshold value and a threshold interval, iteratively incrementing said first threshold value by said threshold interval and calculating each said false result probability entry of said threshold value is equal to said second threshold value.

4. The method according to claim 3, wherein said false result probability is a false positive probability and further wherein said first threshold value is a lower bound of a false negative probability and said second threshold value is an upper bound of said false positive probability.

5. The method according to claim 1, wherein said selecting act retrieves said threshold value from said threshold table, wherein said threshold value is a greatest threshold value having a false result probability less than said desired false result probability.

6. The method according to claim 1, wherein said false result probability is a false positive probability.

7. An apparatus for determining a watermark detection threshold value in a watermark detection system, comprising:
   means for selecting a desired false result probability; and
   means for determining the watermark detection threshold value, wherein means for determining the watermark detection threshold value is performed using the selected desired false result probability given by $$P_{fp} = \frac{m!}{\prod_{i=1}^{m-1}(T+i)}$$

where $P_{fp}$ is said desired false result probability, T is said watermark detection threshold value and m is a dimension of a feature vector, and wherein the watermark detection threshold value is set when a watermark detection measure is a ratio of a largest normalized correlation to a second largest normalized.

8. The apparatus according to claim 7, further comprising:
means for creating a threshold table, wherein said creating means further comprises:
means for calculating each false result probability entry in said threshold table using $$\frac{m!}{\prod_{i=1}^{m-1}(T+i)}$$

means for storing said calculated false result probability in said threshold table and said threshold value used to calculate said false result probability entry;
selecting said threshold value from a threshold table corresponding to said desired false result probability; or
means for selecting a first threshold value;
means for setting a current threshold value to said first threshold value;
means for calculating a false result probability using said current threshold value;
means for calculating a difference value between said calculated false result probability and said desired false result probability;
means for comparing said difference value to a first predetermined value;
means for comparing said difference value to a second predetermined value if a result of said first comparing act is positive; and
means for modifying said current threshold value responsive to said comparisons.

9. The apparatus according to claim 8, wherein said means for calculating is performed using a first threshold value, a second threshold value and a threshold interval, iteratively incrementing said first threshold value by said threshold interval and calculating each said false result probability entry of said threshold table until said first threshold value is equal to said second threshold value.

10. The apparatus according to claim 9, wherein said false result probability is a false positive probability and further wherein said first threshold value is a lower bound of a false negative probability and said second threshold value is an upper bound of said false positive probability.

11. The apparatus according to claim 7, wherein said means for selecting retrieves said threshold value from said threshold table, wherein said threshold value is a greatest threshold value having a false result probability less than said desired false positive probability.

12. The apparatus according to claim 6, wherein said false result probability is a false positive probability.

* * * * *